(12) United States Patent
Iizuka

(10) Patent No.: US 6,624,837 B2
(45) Date of Patent: Sep. 23, 2003

(54) SCANNING OPTICAL ELEMENT AND SCANNING OPTICAL SYSTEM

(75) Inventor: Takashi Iizuka, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/899,168

(22) Filed: Jul. 6, 2001

(65) Prior Publication Data

US 2002/0027593 A1 Mar. 7, 2002

(30) Foreign Application Priority Data

Jul. 10, 2000 (JP) ........................................ 2000-207753

(51) Int. Cl.[7] .................................................. B41J 2/47
(52) U.S. Cl. ....................................................... 347/225
(58) Field of Search ................................ 347/225, 241, 347/243, 244, 256, 259, 260; 359/205, 206, 207, 208

(56) References Cited

U.S. PATENT DOCUMENTS 5,963,355 A   10/1999   Iizuka  ........................ 359/205
6,166,843 A   12/2000   Iizuka  ........................ 359/208

FOREIGN PATENT DOCUMENTS

JP            9-68664     3/1997

*Primary Examiner*—Michael Nghiem
(74) *Attorney, Agent, or Firm*—Greenblum & Bernstein, P.L.C.

(57) ABSTRACT

A scanning optical element made of light transmitting material has a light transmissive first surface, and a reflective second surface. The first and second surfaces have first and second intersection points with first and second reference planes, respectively. The first and second reference planes are perpendicular to a predetermined single axis, on which the first and second intersection points are located. The first surface is tangent to the first reference plane at the first intersection point. The second surface is expressed by a SAG amount defined by a two-dimensional polynomial having variables which are two-dimensional coordinates, in the main scanning direction and in the auxiliary scanning direction, on the second reference plane. Coefficients for the two-dimensional polynomial defining the second surface are configured such that a coefficient for a term having only a first order component with respect to the coordinates in the auxiliary scanning direction is not zero.

7 Claims, 6 Drawing Sheets

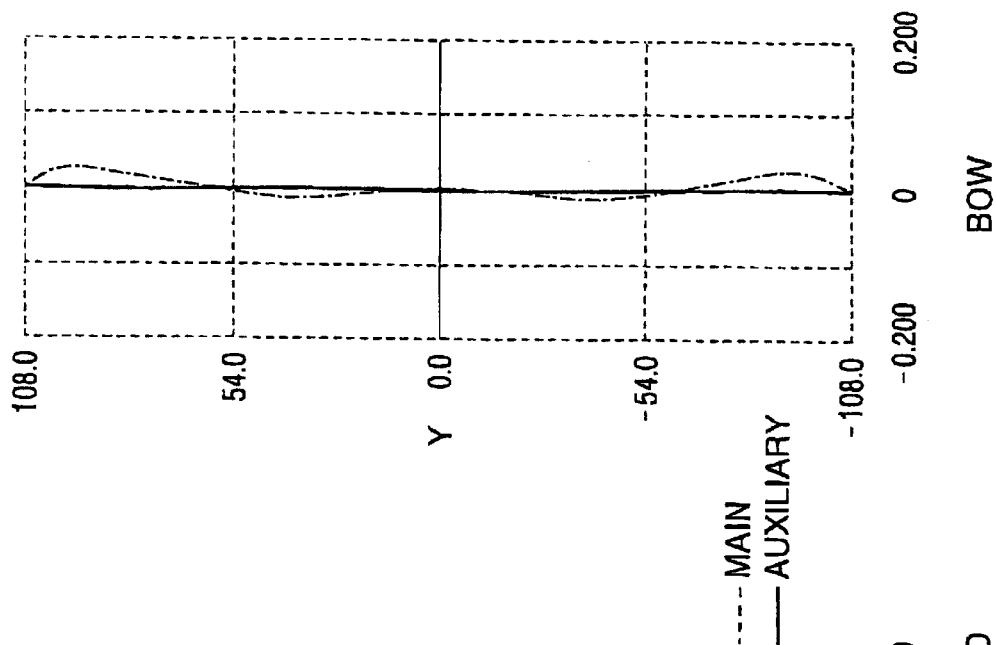
FIG.4A  fθ ERROR
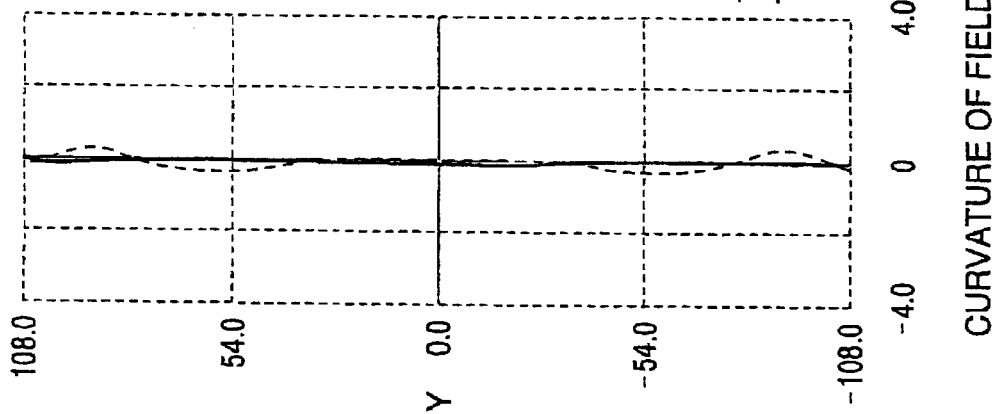
FIG.4B  CURVATURE OF FIELD
--- MAIN
— AUXILIARY
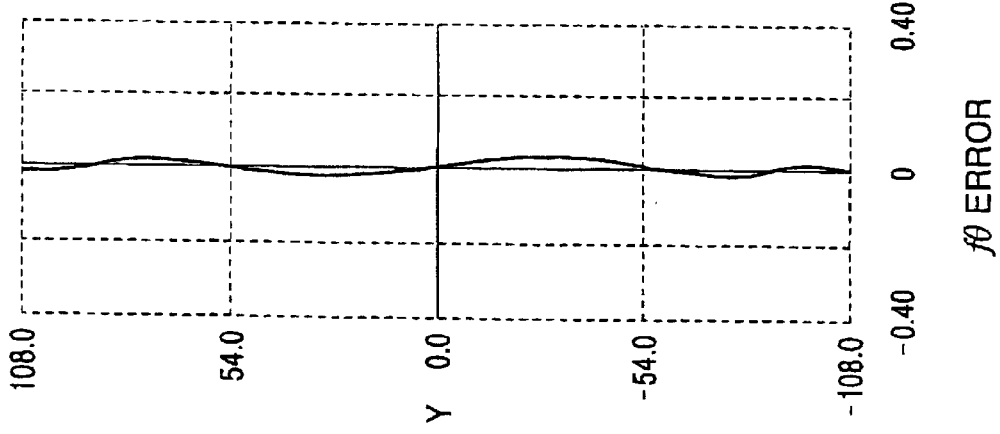
FIG.4C  BOW

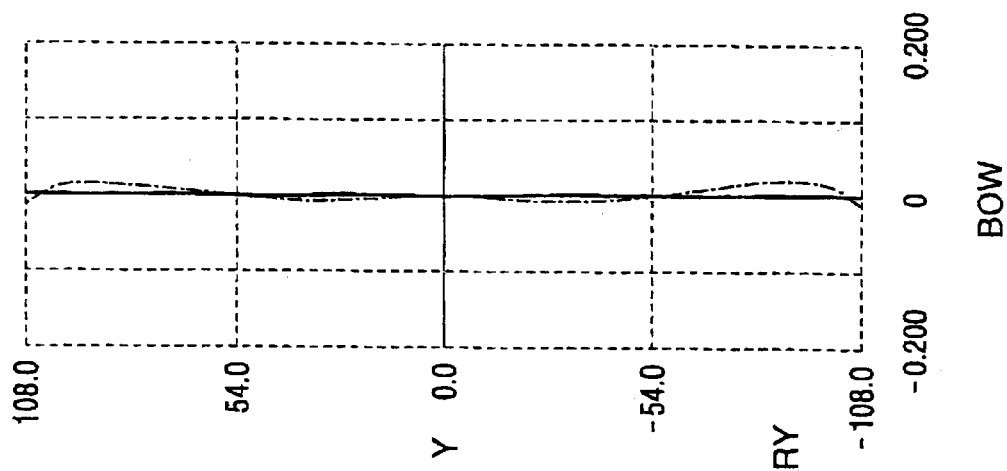
FIG.5A  fθ ERROR
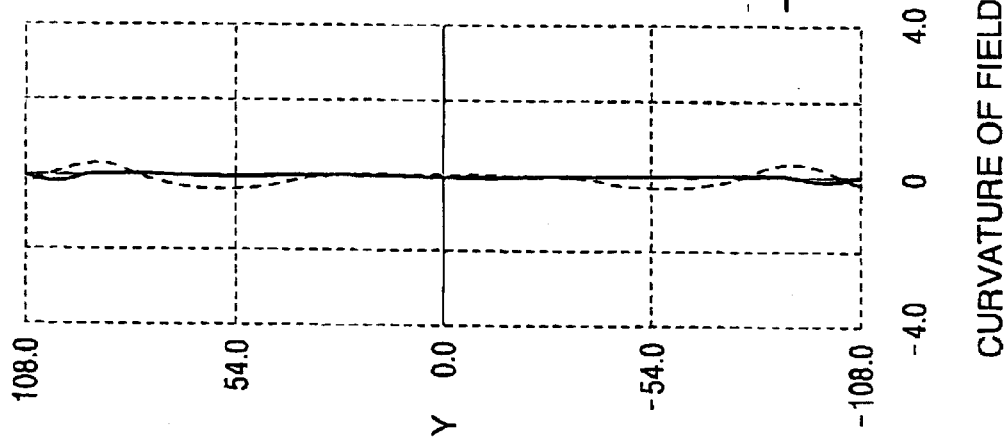
FIG.5B  CURVATURE OF FIELD
--- MAIN
— AUXILIARY
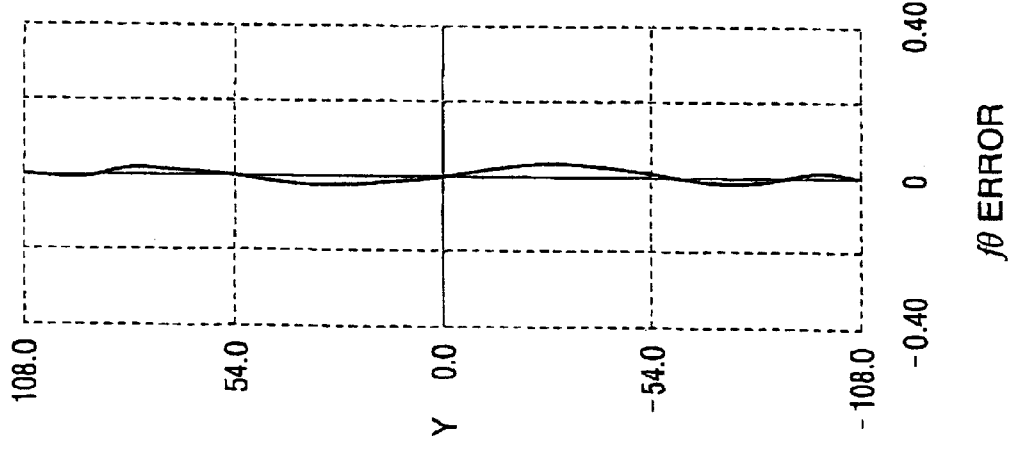
FIG.5C  BOW

SCANNING OPTICAL ELEMENT AND SCANNING OPTICAL SYSTEM

BACKGROUND OF THE INVENTION

The present invention relates to a scanning optical element for a scanning optical system, and a scanning optical system employing the scanning optical element. The scanning optical element is used for converging a scanning beam on a surface to be scanned.

A conventional scanning optical system is configured such that a laser beam emitted by a laser diode is deflected by a polygonal mirror to scan within a predetermined angular range, and the scanning beam is converged on a surface to be scanned through a scanning optical system so that a beam spot is formed on the surface. The beam spot moves on the surface, as the polygonal mirror rotates, in a predetermined direction, which will be referred to hereinafter as a main scanning direction. The surface to be scanned is typically formed with a photosensitive layer, and by ON/OFF modulating the scanning laser beam, an electrostatic latent image can be formed on the surface.

In the description hereinafter, as defined above, a direction on the surface in which the beam spot moves is referred to as the main scanning direction, and a direction, on the surface, perpendicular to the main scanning direction is referred to as an auxiliary scanning direction. The shape and power of optical elements will also be explained with reference to the main and auxiliary scanning directions on the surface to be scanned.

In the scanning optical system, it is necessary that various aberrations on the surface to be scanned are well compensated for in accordance with a required accuracy of an image to be formed on the surface. Typically, in order to compensate for the aberrations, a plurality of anamorphic lenses are employed, or curved mirrors and an anamorphic lens are used in combination.

As described above, in the conventional scanning optical system, a plurality of lenses and/or mirror should be employed to compensate for the aberrations. Such a configuration make it difficult to reduce the size of the scanning optical system and/or manufacturing cost.

SUMMARY OF THE INVENTION

It is therefore an object of the present invention to provide an improved scanning optical element which is capable of compensating for the aberrations sufficiently and enables downsizing of the scanning optical system and lowering of the manufacturing cost.

For the object, according to an aspect of the invention, there is provided a scanning optical element for receiving a scanning light beam deflected to scan by a deflecting system and converging the received scanning light beam on a surface to be scanned such that a beam spot moving in a main scanning direction is formed on the surface to be scanned.

The scanning optical element is made of light transmitting material, and has a first surface that allows the received scanning light beam to pass through so that the scanning light beam proceeds in said scanning optical element, and a second surface that reflects the scanning beam proceeded in said scanning optical element and directs the scanning beam toward said first surface.

The first surface has a first intersection point with a first reference plane, and the second surface has a second intersection point with a second reference plane. The first reference plane and the second reference plane are perpendicular to a predetermined single axis. The first and second intersection points are on the reference axis, and the first surface is an optical curved surface which is tangent to the first reference plane at the first intersection point. The second surface being expressed by a SAG amount defined by a two-dimensional polynomial having variables which are two-dimensional coordinates, in the main scanning direction and in the auxiliary scanning direction, on the second reference plane. An origin point of the two-dimensional coordinates on the second reference plane is the second intersection point.

Coefficients for the two-dimensional polynomial defining the second surface being configured such that, a coefficient for a term having only a first order component with respect to the coordinates in the auxiliary scanning direction has a value other than zero.

Accordingly, the scanning optical element receives a light beam with a first surface, and reflects the beam with the second surface, the reflected beam emerging from the first surface. Therefore, the scanning optical element functions as an optical element having three surfaces. By shaping each surface appropriately, various aberrations can be well compensated for with a single optical element.

Optionally, each of the first surface and the second surface is a rotationally asymmetrical aspherical surface.

Further optionally, the first surface is symmetrical either in the main scanning direction and in the auxiliary scanning direction with respect to the origin point where the predetermined reference axis intersects with the first surface.

In the above case, coefficients of the polynomial expressing the second surface for odd order terms in the main scanning direction are zero.

Further optionally, the second surface may be expressed by a two-dimensional polynomial below, $$X(Y, Z) = \frac{Y^2 + Z^2}{r\left\{1 + \sqrt{1 - \frac{(\kappa+1)(Y^2 + Z^2)}{r^2}}\right\}} + \sum B_{mn} Y^m Z^n$$

where,

Y represents a height in the main scanning direction,

Z represents a height in the auxiliary scanning direction,

X(Y, Z) represents a SAG amount at a point (Y, Z) on the second reference plane, r is a radius of curvature of the second surface on the origin point, κ is a conical coefficient, $B_{mn}$ represent coefficients, and a coefficient $B_{01}$ has a value other than zero.

According to another aspect of the invention, there is provided a scanning optical system, which includes a light source, a polygonal mirror that is rotated to deflect a beam emitted by the light source to scan, and a scanning optical element for receiving a scanning light beam deflected to scan by a polygonal mirror and converging the received scanning light beam on a surface to be scanned such that a beam spot moving in a main scanning direction is formed on the surface to be scanned. Specifically, the scanning optical element is made of light transmitting material, and a first surface that allows the received scanning light beam to pass through so that the scanning light beam proceeds in the scanning optical element, and a second surface that reflects the scanning beam proceeded in the scanning optical element and directs the scanning beam toward the first surface.

The first surface has a first intersection point with a first reference plane, and the second surface has a second intersection point with a second reference plane. The first reference plane and the second reference plane are perpendicular to a predetermined single axis. The first and second intersection points are on the reference axis, and the first surface is an optical curved surface which is tangent to the first reference plane at the first intersection point. The second surface being expressed by a SAG amount defined by a two-dimensional polynomial having variables which are two-dimensional coordinates, in the main scanning direction and in the auxiliary scanning direction, on the second reference plane. An origin point of the two-dimensional coordinates on the second reference plane is the second intersection point.

Coefficients for the two-dimensional polynomial defining the second surface being configured such that, a coefficient for a term having only a first order component with respect to the coordinates in the auxiliary scanning direction has a value other than zero.

Optionally, the polygonal mirror and the scanning optical element being arranged such that a beam incident on the polygonal mirror and a beam reflected by the polygonal mirror are spatially separated in the auxiliary scanning direction, and a beam incident on the scanning optical element and a beam emerging from the scanning optical element are spatially separated in the auxiliary scanning direction.

BRIEF DESCRIPTION OF THE ACCOMPANYING DRAWINGS

FIG. 1 schematically shows a perspective view of a scanning optical system according to the present invention;

FIGS. 4A–4C are graphs illustrating an fθ error, curvature of field and bow characteristics of the optical scanning system according to the first embodiment;

FIGS. 5A–5C are graphs illustrating an fθ error, curvature of field and bow characteristics of the optical scanning system according to a second embodiment.

DESCRIPTION OF THE EMBODIMENTS

Hereinafter, a configuration of a scanning optical system according to the invention, and two numerical embodiments of an fθ optical element will be described with reference to the accompanying drawings.

The scanning optical system described hereinafter is applicable to, for example, an exposure unit for a laser beam printer, wherein a laser beam is ON/OFF modulated in accordance with an image data and scanned on a rotating photoconductive drum so that a two-dimensional electrostatic latent image is formed thereon. Since such a laser beam printer has been conventionally known, the description will not be provided herein for the sake of simplicity of the description.

Figure 1:
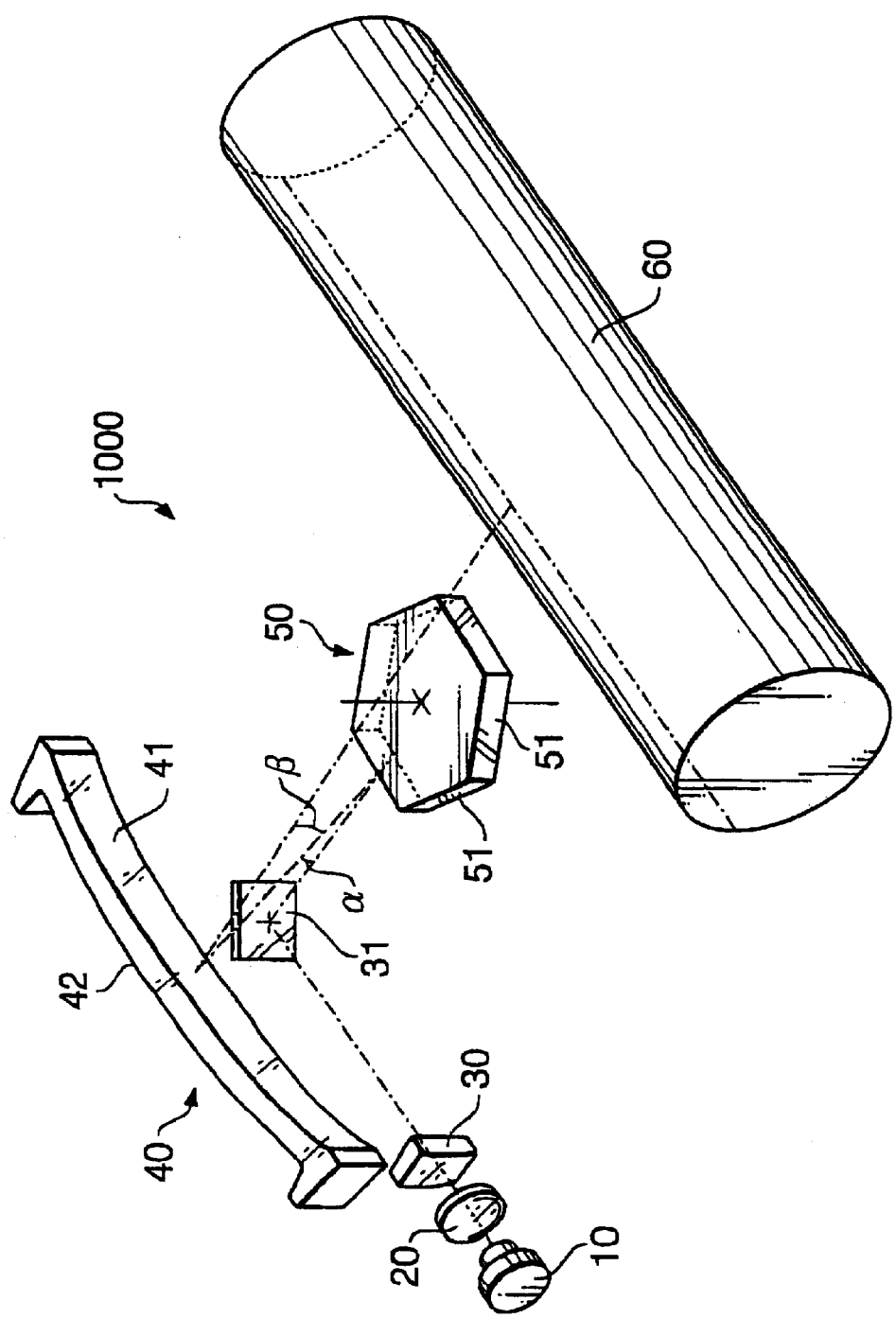

FIG. 1 shows a perspective view of a main part of a scanning optical system 1000 according to the present invention. The scanning optical system 1000 is provided with a laser diode 10, a collimating lens 20, an anamorphic lens 30, a planar mirror 31, a scanning optical element 40 and a polygonal mirror 50.

The laser diode 10 emits a laser beam, which is a diverging beam. The laser beam is collimated by the collimating lens 20 and then incident on the anamorphic lens 30. The laser beam passed through the anamorphic lens 30 is incident on a reflection surface 51 of the polygonal mirror 50 via the planar mirror 31. As shown in FIG. 1, the beam reflected by the planar mirror 31 is incident on a reflection surface 51 of the polygonal mirror at a certain angle, with respect to a normal to the reflection surface 51, in the auxiliary scanning direction.

The anamorphic lens 30 has a relatively strong positive power in the main scanning direction and a relatively weak positive power in the auxiliary scanning direction. Due to the positive power of the anamorphic lens 30 in the auxiliary scanning direction, the laser beam is once converged, in the auxiliary scanning direction, on a plane in the vicinity of a reflection surface 51 of the polygonal mirror 50. The laser beam reflected by the reflection surface 51 of the polygonal mirror 50 is incident on the scanning optical element 40 and re-converged with the power of the scanning optical element. With this configuration, a facet error of each reflection surface 51 can be cancelled.

The laser beam incident on the reflection surface 51 is reflected thereby toward the scanning optical element 40. Hereinafter, the angle formed between the laser beam incident on the reflection surface 51 and the laser beam reflected by the reflection surface 51 in the auxiliary scanning direction will be referred to as a first separation angle α. The laser beam reflected by the reflection surface 51 is incident on the scanning optical element 40.

The scanning optical element 40 is a single element formed of light transmitting material. A polygonal mirror side surface (hereinafter referred to as a first surface) 41 of the scanning optical element 40 is formed as a light transmitting surface which allows the incident beam to pass therethrough, while an opposite side surface (hereinafter referred to as a second surface) 42 is formed as a reflective surface which reflects the beam passed through the first surface 41 and proceeding inside the fθ element 40 to emerge from the first surface 41. The second surface 42 is formed with a reflective coating such as silver or aluminum coating formed by evaporation.

The beam which emerges from the first surface 41 proceeds toward a photoconductive drum 60. Hereinafter, an angle formed between a beam which impinges on the scanning optical element 40 and a beam which emerges from the first surface 41, in the auxiliary scanning direction, is referred as a second separation angle β. The laser beam which emerges from the first surface 41 passes above the polygonal mirror 50 and is incident on a photoconductive drum 60, and forms a beam spot thereon. As the polygonal mirror 50 rotates, the beam spot formed on the circumferential surface of the photoconductive drum 60 moves in the main scanning direction, which is parallel to the generatrix of the cylindrical shape of the photoconductive drum 60. A line formed by the scanning beam spot on the photoconductive drum 60 will be referred to as a scanning line. As described above, the laser beam is once converged on a plane in the vicinity of the reflection surface 51 to cancel the facet error thereof. With this configuration, a shift of the scanning line in the auxiliary direction due to the facet error of the polygonal mirror 50 can be prevented.

The first surface 41 and the second surface 42 are inclined with respect to each other in the auxiliary scanning direction.

Figure 6:
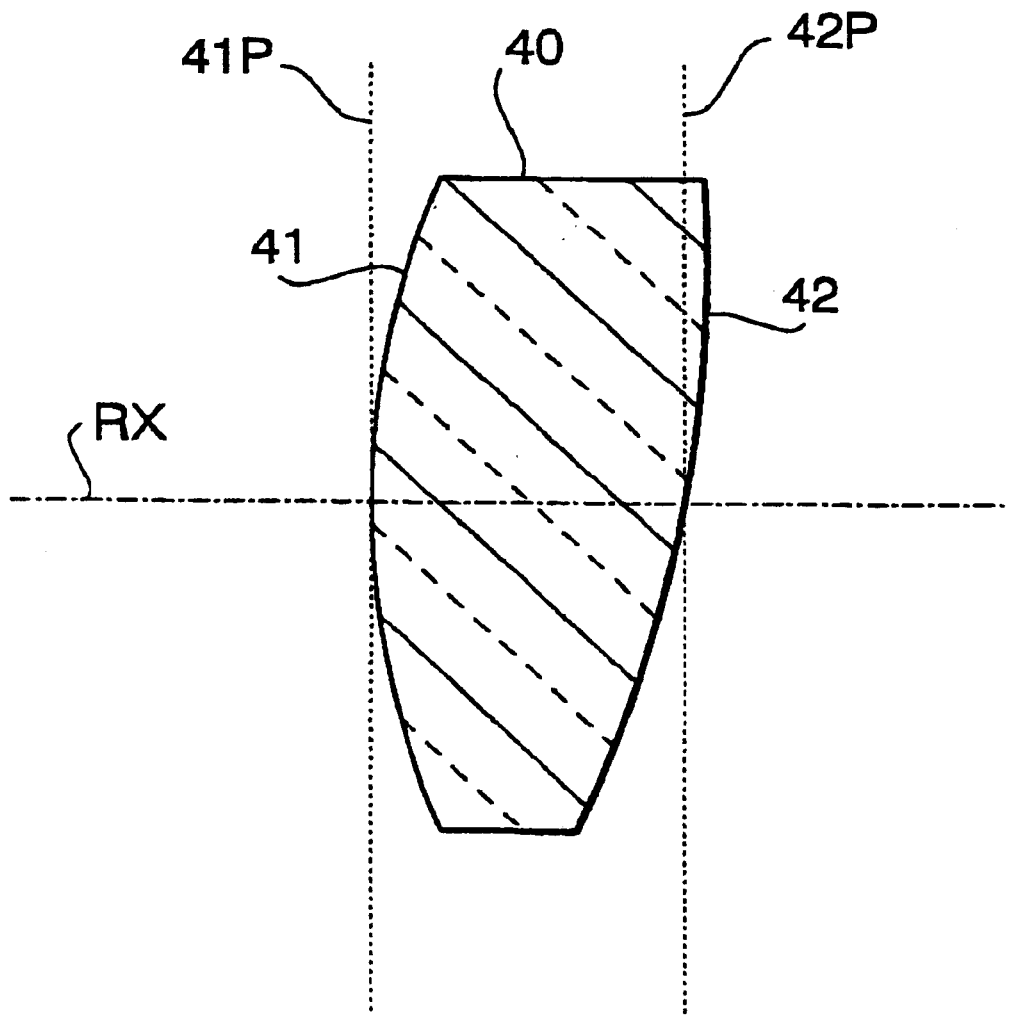
FIG. 6 is a cross sectional view of the scanning optical element.

FIG. 6 schematically shows a cross-sectional view of the scanning optical element 40. The first surface 41 is defined by a SAG amount with respect to a first reference plane 41P, and the second surface 42 is defined by a SAG amount with respect to a second reference plane 42P. Each of the first reference plane 41P and the second reference plane 42P is perpendicular to a predetermined reference axis RX. It should be noted that the first surface 41 and the second surface 42 have intersection points, on the reference axis RX, with the first reference surface 41P and the second reference surface 42P, respectively.

Each of the first surface 41 and the second surface 42 is a rotationally asymmetrical aspherical surface which can be expressed by a well-known two-dimensional polynomial with respect to a certain reference axis.

The SAG amount defining the first surface 41 with respect to the first reference plane 41P can be expressed by a two-dimensional polynomial whose variables are coordinates along axes respectively extending in the main and auxiliary scanning directions on the first reference plane 41P. An origin point of the coordinates on the first reference plane 41P is a point where the reference axis RX intersects with the first reference plane 41P. In the embodiments, the first surface 41 is an optical curved surface which is tangential to the first reference plane 41P at the point where the reference axis RX intersects with the first reference plane 41P.

The SAG amount defining the second surface 42 with respect to the second reference plane 42P is expressed by a two-dimensional polynomial whose variables are coordinates along axes respectively extending in the main and auxiliary scanning directions on the second reference plane. An origin point of the coordinates on the second reference plane 42P is a point where the reference axis RX intersects with the second reference plane 42P. It should be noted that, as shown in FIG. 6, the first surface 41 is tangent to the first reference surface 41P, while the second surface 42 intersects with the second reference plane 42P. The positional relationship between the first and second surfaces 41 and 42 as shown in FIG. 6 will be referred such that the two surfaces are "inclined" with respect to each other, in this specification.

Specifically, coefficients for odd order terms of coordinates in the auxiliary scanning direction of the polynomial that expresses the first surface 41 are zero. Coefficients for a term including only a first order of the coordinates in the auxiliary scanning direction of the polynomial that expresses the second surface 42 has a value other than zero. With such configurations, the second surface 42 is defined as a surface that is inclined with respect to the first surface 41. It should be noted that, regarding terms including coordinates in the main scanning direction, coefficients of the odd order terms are zero for either of the first and second surfaces 41 and 42. This means that the shape of each of the surfaces 41 and 42 is symmetrical with respect to the origin points.

Specifically, each of the first surface 41 and the second surface 42 is expressed by the two-dimensional polynomial (1) below.

$$X(Y, Z) = \frac{Y^2 + Z^2}{r\left\{1 + \sqrt{1 - \frac{(\kappa + 1)(Y^2 + Z^2)}{r^2}}\right\}} + \sum B_{mn} Y^m Z^n \quad (1)$$

where,

Y represents a height from the origin point, on a reference plane, in the main scanning direction, Z represents a height from the origin point in the auxiliary scanning direction, on a reference plane, X(Y, Z) represents a SAG amount at coordinates (Y, Z) on a reference plane, r is a radius of curvature of a surface at the origin point, κ is a conical coefficient, and $B_{mn}$ represent coefficients.

It should be noted that the polynomial (1) generally represents a rotationally asymmetrical curved surface. Coefficients for the odd terms of the coordinates in the auxiliary scanning direction are represented by $B_{mn}$ where n has an odd value. Further, a coefficient of the term including only the first order of the coordinates in the auxiliary scanning direction is indicated by $B_{01}$.

When the first surface 41 is expressed by the polynomial (1), coefficients $B_{mn}$ for n as odd numbers are all zero. Further, when the second surface 42 is expressed by the polynomial (1), coefficients $B_{01}$ has a value other than zero.

FIRST EMBODIMENT

Figure 2:
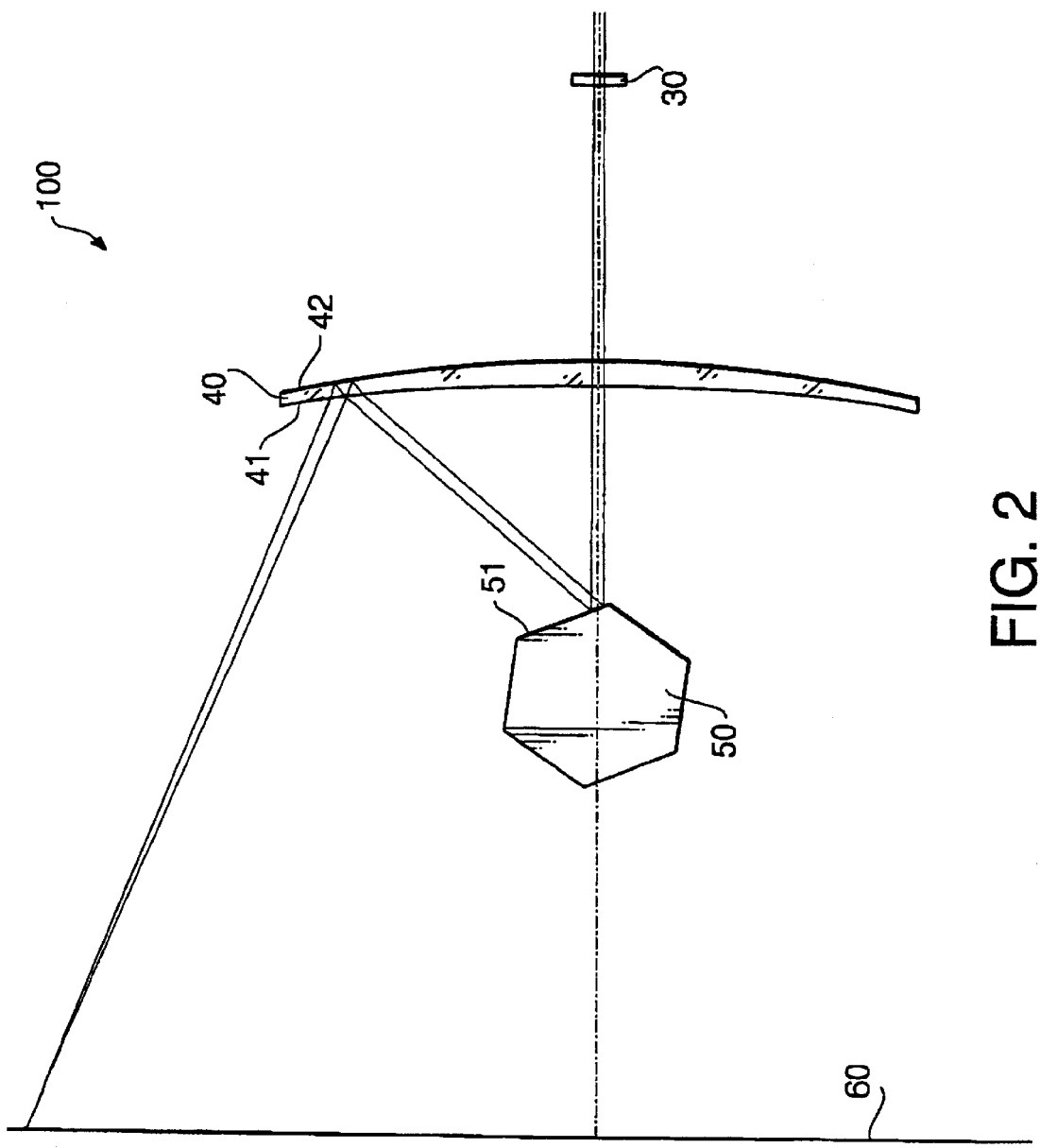
FIG. 2 shows a plan view of a configuration of a scanning optical system according to a first embodiment of the invention.
Figure 3:
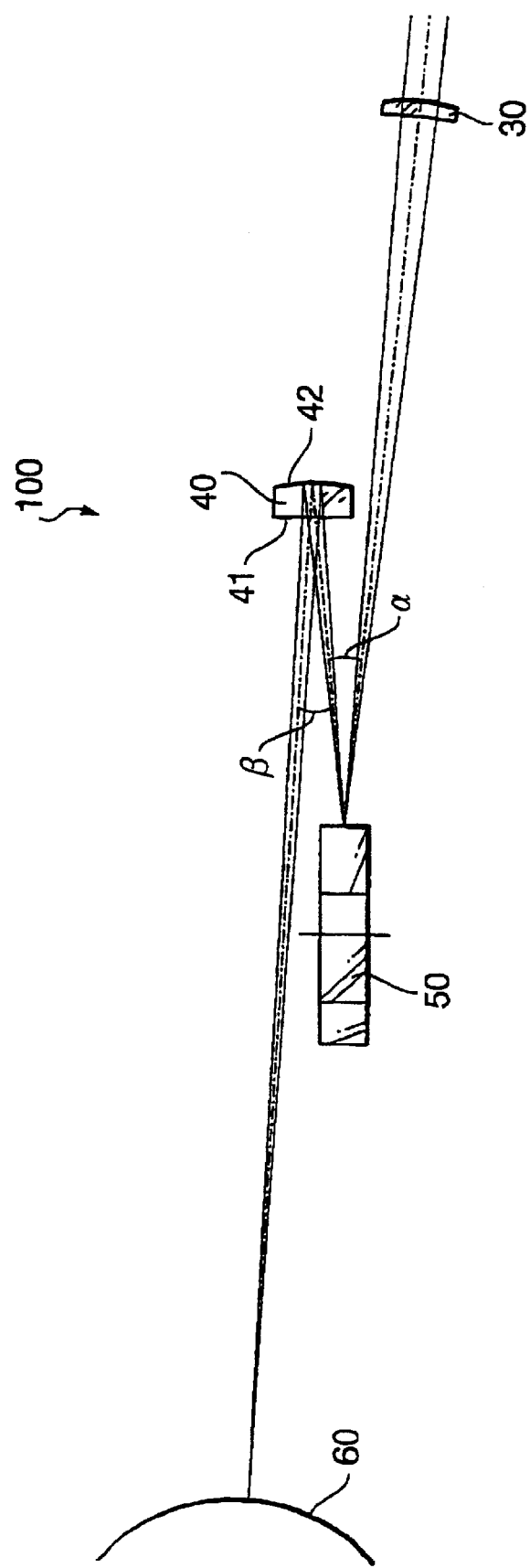
FIG. 3 shows a side view of a configuration of the scanning optical system shown in FIG. 2.

FIG. 2 shows a plan view of a configuration of a scanning optical system 100 according to a first embodiment of the invention, and FIG. 3 shows a side view of a configuration of the scanning optical system 100 shown in FIG. 2. In the drawings, a structure from the anamorphic lens 30 to the photoconductive drum 60 is shown. It should be noted that, the optical path is developed and the planar mirror 31 is omitted from the drawings for the sake of simplicity of the description.

TABLE 1 indicates a numerical data of the first embodiment. In TABLE 1, α denotes the first separation angle, β denotes the second separation angle, ry denotes a radius of curvature in the main scanning direction, rz denotes a radius of curvature in the auxiliary scanning direction (which is omitted if a surface is rotationally symmetrical), d denotes a distance between surfaces on an optical axis and n denotes a refractive index at a wavelength of 780 nanometers. Surface numbers are assigned in the order in which the laser beam travels: #1 and #2 are the surfaces of the anamorphic lens 30; #3 indicates the reflection surface 51 of the polygonal mirror 50; #4 denotes the first surface 41 of the fθ optical element 40; #5 denotes the second surface 42 of the fθ optical element 40; and #6 denotes the first surface 41 of the fθ optical element 40.

TABLE 1

| Scanning Coefficient: 135.5 | | | α = 10.0° | β = 8.0° |
|---|---|---|---|---|
| surface No. | ry | rz | d | n |
| #1 | −72.000 | 55.424 | 2.000 | 1.48617 |
| #2 | inf. | | 113.0 | |
| #3 | inf. | | 50.000 | |
| #4 | −265.075 | inf. | 5.000 | 1.48617 |

TABLE 1-continued

| Scanning Coefficient: 135.5 | | | α = 10.0° | β = 8.0° |
|---|---|---|---|---|
| surface No. | ry | rz | d | n |
| #5 | −231.860 | <TABLE 3> | 5.000 | 1.48617 |
| #6 | −265.075 | inf. | 160.035 | |

A shape of the first surface (i.e., surfaces #4 and #6) 41 of the fθ optical element 40 in the main scanning direction is expressed by the SAG amount X(Y) which is a function of a height Y in the main scanning direction from the origin point. The SAG amount X(Y) is given by equation (2).

$$X(Y) = \frac{Y^2}{ry\left\{1 + \sqrt{1 - \frac{(\kappa+1)Y^2}{ry^2}}\right\}} + \sum AM_p Y^p \quad (2)$$

where, $AM_p$ represents an aspherical coefficient of p-th order. Further, the cross sectional shape of the first surface 41 in the auxiliary scanning direction is an arc, and the curvature Cz(Y) thereof at a position Y in the main scanning direction is expressed by equation (3).

$$Cz(Y) = Czo + \Sigma AS_q Y^q \quad (3)$$

where, Czo is a curvature in the auxiliary scanning direction on the origin point, $AS_q$ is a q-th order curvature coefficient. The values of the coefficients $AM_p$ and $AS_q$ are indicated in TABLE 2.

TABLE 2

| Main scanning direction | | Auxiliary scanning direction | |
|---|---|---|---|
| κ | 0.0 | | |
| AN2 | 9.57071 × 10⁻⁰⁴ | AS2 | 3.32077 × 10⁻⁰⁸ |
| AM4 | −6.81320 × 10⁻¹¹ | AS4 | −1.02051 × 10⁻¹¹ |
| AM6 | −3.84519 × 10⁻¹¹ | AS6 | −5.96555 × 10⁻¹⁵ |
| AM8 | −9.94042 × 10⁻¹⁸ | AS8 | 1.46273 × 10⁻¹⁶ |
| AM10 | −5.33698 × 10⁻²¹ | AS10 | 0 |
| AM12 | −1.13355 × 10⁻²⁴ | AS12 | 0 |

It should be noted that the radius of curvature of the first surface 41 in the auxiliary scanning direction on the origin point is infinity. Therefore, CzO=0. Regarding the coefficients $AM_p$ and $AS_q$, since the values thereof for odd order terms are zero, only the values for even order terms are indicated in TABLE 2. It should be noted that the first surface 41 is symmetrical with respect to the origin point in the main scanning direction. Further, since the cross section of the first surface 41 in the auxiliary scanning direction is an arc, it is also symmetrical with respect to the original point in the auxiliary scanning direction.

The shape of the first surface 41 can also be expressed as by the SAG amount with respect to the first reference plane using the two-dimensional polynomial (1). In such a case, since the first surface 41 is not inclined with respect to the first reference plane in the auxiliary scanning direction, coefficients for all the odd order terms in the auxiliary scanning direction are zero.

The shape of the second surface 42 can be expressed by the two-dimensional polynomial (1). The coefficients $B_{mn}$ for the second surface 42 are indicated in TABLE 3. Regarding the shape in the auxiliary scanning direction, the coefficient $B_{01}$ for the term including only the first order of the coordinate in the auxiliary scanning direction, and the coefficients for odd order terms (i.e., n is an odd number) have values other than zero. Therefore, the second surface 42 is inclined, in the auxiliary scanning direction, with respect to the second reference plane. Regarding the shape in the main scanning direction, the coefficients for the odd order terms are all zero, and therefore, the second surface 42 is symmetrical with respect to the origin point in the main scanning direction. In TABLE 3, m for odd terms are omitted.

TABLE 3

| Bmn | n = 0 | n = 1 | n = 2 |
|---|---|---|---|
| m = 0 | 0 | −4.7676 × 10⁻⁰² | −1.9823 × 10⁻⁰³ |
| m = 2 | 2.9399 × 10⁻⁰⁴ | 3.0589 × 10⁻⁰⁶ | 2.0803 × 10⁻⁰⁷ |
| m = 4 | 3.9253 × 10⁻⁰⁸ | 4.4950 × 10⁻¹⁰ | −2.8224 × 10⁻¹¹ |
| m = 6 | −1.6234 × 10⁻¹¹ | −5.9046 × 10⁻¹³ | 2.1719 × 10⁻¹⁴ |
| m = 8 | 1.0587 × 10⁻¹⁵ | 2.1083 × 10⁻¹⁶ | 9.7026 × 10⁻¹⁸ |
| m = 10 | −5.8655 × 10⁻¹⁹ | −3.1655 × 10⁻²⁰ | 3.4090 × 10⁻²¹ |
| m = 12 | 8.2703 × 10⁻²³ | 0 | 0 |

| Bmn | n = 3 | n = 4 | |
|---|---|---|---|
| m = 0 | −2.6829 × 10⁻⁰⁶ | 1.6459 × 10⁻⁰⁶ | |
| m = 2 | −1.8380 × 10⁻⁰⁹ | −3.9318 × 10⁻¹² | |
| m = 4 | 4.6055 × 10⁻¹³ | −1.6421 × 10⁻¹³ | |
| m = 6 | −8.1058 × 10⁻¹⁶ | −4.4493 × 10⁻¹⁷ | |
| m = 8 | 4.8969 × 10⁻¹⁹ | 1.6297 × 10⁻²⁰ | |
| m = 10 | 0 | 0 | |
| m = 12 | 0 | 0 | |

The first reference plane and the second reference plane are parallel to each other, and perpendicular to the same reference axis. Further, the first surface 41 is not inclined with respect to the first reference plane in the auxiliary scanning direciton, and the second surface 42 is inclined with respect to the second reference plane in the auxiliary scanning direction. Therefore, the first surface 41 and the second surface 42 are inclined relative to each other in the auxiliary scanning direction.

FIGS. 4A–4C are graphs illustrating optical performance of the scanning optical system 100 according to the first embodiment. Specifically, FIG. 4A shows an fθ error (i.e., a displacement with respect to a designed position of a beam spot), FIG. 4B shows curvature of field (broken line: main scanning direction; and solid line: auxiliary scanning direction), and FIG. 4C shows a bow. In each graph, the vertical axis represents an image height (i.e., a distance, in the main scanning direction, from the center of a scanning line on the photoconductive drum), and the horizontal axis represents the amount of aberration (unit: mm). As shown in FIGS. 4A–4C, although a single fθ optical element is used for reducing the accommodation space and fabrication cost, the aberrations are well compensated for.

SECOND EMBODIMENT

TABLE 4 shows the numerical data for the second embodiment.

TABLE 4

| Scanning Coefficient: 135.5 | | | α = 10.0° | β = 8.1° |
|---|---|---|---|---|
| surface No. | ry | rz | d | n |
| #1 | −72.000 | 55.424 | 2.000 | 1.48617 |
| #2 | inf. | | 113.0 | |
| #3 | inf. | | 50.000 | |

TABLE 4-continued

| Scanning Coefficient: 135.5 | | | α = 10.0° | β = 8.1° |
|---|---|---|---|---|
| surface No. | ry | rz | d | n |
| #4 | −265.955 | −4040.000 | 5.000 | 1.51921 |
| #5 | −232.809 | <refer to TABLE 6> | 5.000 | 1.51921 |
| #6 | −265.955 | −4040.000 | 160.066 | |

A shape of the first surface (i.e., surfaces #4 and #6) 41 of the scanning optical element 40 in the main scanning direction is given by equation (2). Further, the cross sectional shape of the first surface 41 in the auxiliary scanning direction, which is an arc, and the curvature Cz(Y) thereof at a position Y in the main scanning direction is expressed by equation (3). The coefficients for the two-dimensional polynomial are indicated in TABLE 5. Similarly to the first embodiment, coefficients for the odd order terms of the polynomial in the auxiliary scanning direction are all zero.

TABLE 5

| Main scanning direction | | | |
|---|---|---|---|
| κ | 0.0 | Auxiliary scanning direction | |
| AM2 | $9.08569 \times 10^{-04}$ | AS2 | $2.71931 \times 10^{-08}$ |
| AM4 | $-5.03458 \times 10^{-11}$ | AS4 | $-1.10719 \times 10^{-11}$ |
| AM6 | $-3.68155 \times 10^{-11}$ | AS6 | $-8.15160 \times 10^{-15}$ |
| AM8 | $2.79607 \times 10^{-17}$ | AS8 | $9.91991 \times 10^{-17}$ |
| AM10 | $8.32533 \times 10^{-21}$ | AS10 | 0 |
| AM12 | $5.65624 \times 10^{-25}$ | AS12 | 0 |

The shape of the second surface 42 can be expressed by the two-dimensional polynomial (1). The coefficients $B_{mn}$ for the second surface 42 are indicated in TABLE 6. Regarding the shape in the auxiliary scanning direction, the coefficient $B_{01}$ for the term including only the first order of the coordinate in the auxiliary scanning direction, and the coefficients for the odd terms (i.e., n is an odd number) have values other than zero. Therefore, the second surface 42 is inclined, in the auxiliary scanning direction, with respect to the second reference plane. Regarding the shape in the main scanning direction, the coefficients for the odd order terms are all zero, and therefore, the second surface 42 is symmetrical with respect to the origin point in the main scanning direction. In TABLE 6, m for odd terms are omitted.

TABLE 6

| Bmn | n = 0 | n = 1 | n = 2 |
|---|---|---|---|
| m = 0 | 0 | $-4.5984 \times 10^{-02}$ | $-1.9431 \times 10^{-03}$ |
| m = 2 | $2.9166 \times 10^{-04}$ | $3.2451 \times 10^{-06}$ | $2.0453 \times 10^{-07}$ |
| m = 4 | $3.8681 \times 10^{-08}$ | $1.7809 \times 10^{-10}$ | $-2.6493 \times 10^{-11}$ |
| m = 6 | $-1.6352 \times 10^{-11}$ | $-4.4024 \times 10^{-13}$ | $2.2159 \times 10^{-14}$ |
| m = 8 | $1.1046 \times 10^{-15}$ | $1.8020 \times 10^{-16}$ | $1.2789 \times 10^{-18}$ |
| m = 10 | $-5.6577 \times 10^{-19}$ | $-2.9710 \times 10^{-20}$ | $3.4579 \times 10^{-21}$ |
| m = 12 | $8.0406 \times 10^{-23}$ | 0 | 0 |

| Bmn | n = 3 | n = 4 |
|---|---|---|
| m = 0 | $-1.9645 \times 10^{-06}$ | $1.4789 \times 10^{-06}$ |
| m = 2 | $-2.3905 \times 10^{-09}$ | $1.1671 \times 10^{-11}$ |
| m = 4 | $8.0116 \times 10^{-13}$ | $-1.4362 \times 10^{-13}$ |
| m = 6 | $-7.4881 \times 10^{-16}$ | $-4.3789 \times 10^{-17}$ |
| m = 8 | $3.9773 \times 10^{-19}$ | $1.6323 \times 10^{-20}$ |
| m = 10 | 0 | 0 |
| m = 12 | 0 | 0 |

FIGS. 5A–5C are graphs illustrating optical performance of the scanning optical system according to the first embodiment. Specifically, FIG. 5A shows an fθ error (i.e., a displacement with respect to a designed position of a beam spot), FIG. 5B shows curvature of field (broken line: main scanning direction; and solid line: auxiliary scanning direction), and FIG. 5C shows a bow. In each graph, the vertical axis represents an image height (i.e., a distance, in the main scanning direction, from the center of a scanning line on the photoconductive drum), and the horizontal axis represents the amount of aberration (unit: mm). As shown in FIGS. 5A–5C, although a single scanning element is used for reducing the accommodation space and fabrication cost, the aberrations are well compensated.

As described above, the fθ optical element according to the present invention receives a light beam with a first surface, and reflects the beam with the second surface, the reflected beam emerging from the first surface. Therefore, the fθ optical element functions as an optical element having three surfaces. By shaping each surface appropriately, various aberrations can be well compensated for with a single optical element.

Further, by inclining the first and second surfaces relatively in the auxiliary scanning direction, when the fθ optical element is employed in a scanning optical apparatus in which the beams incident on and emerging from the optical element are spatially separated in the auxiliary scanning direction, aberrations can be compensated effectively.

Furthermore, since the fθ optical system can be formed as a single optical element, the number of elements to be employed in a scanning optical apparatus employing such an optical device can be reduced, and the size of the apparatus as well as the size of the optical system itself can be made small, which contributes to reduction of the manufacturing cost.

The present disclosure relates to the subject matter contained in Japanese Patent Application No. 2000-207753, filed on Jul. 10, 2000, which is expressly incorporated herein by reference in its entirety.

What is claimed is:

1. A scanning optical element for receiving a scanning light beam deflected to scan by a deflecting system and converging the received scanning light beam on a surface to be sscanned such that a beam spot moving in a main scanning direction is formed on the surface to be scanned, said scanning optical element comprising a light transmitting material, said scanning optical element having a first surface that allows the received scanning light beam to pass therethrough so that the scanning light beam proceeds in said scanning optical element, and a second surface that reflects the scanning beam proceeding in said scanning optical element, and directs the scanning beam toward said first surface, said first surface having a first intersection point with a first reference plane, said second surface having a second intersection point with a second reference plane, said first reference plane and said second reference plane being perpendicular to a predetermined axis, said first and second intersection points being on said reference axis, said first surface being an optical curved surface which is tangent to said first reference plane at said first intersection point, said second surface being expressed by a SAG amount defined by a two-dimensional polynomial having variables which are two-dimensional coordinates, in the main scanning direction and in an auxiliary scanning direction of the surface to be scanned, on said second reference plane, an origin point of said two-dimensional coordinates on said second reference plane being said second intersection point, coefficients for the two-dimensional polynomial defining said second surface being configured such that, a coefficient for a term having only a first order component with respect to the coordinates in the auxiliary scanning direction has a value other than zero.

2. The scanning optical element according to claim 1, wherein each of said first surface and said second surface is a rotationally asymmetrical aspherical surface.

3. The scanning optical element according to claim 1, wherein said first surface is symmetrical either in the main scanning direction and in the auxiliary scanning direction with respect to the origin point where said predetermined reference axis intersects with said first surface.

4. The scanning optical element according to claim 3, coefficients of the polynomial expressing said second surface for odd order terms in the main scanning direction being zero.

5. The scanning optical element according to claim 4, wherein said second surface is expressed by a two-dimensional polynomial below, $$X(Y, Z) = \frac{Y^2 + Z^2}{r\left\{1 + \sqrt{1 - \frac{(\kappa+1)(Y^2 + Z^2)}{r^2}}\right\}} + \sum B_{mn} Y^m Z^n$$

where,

Y represents a height in the main scanning direction,

Z represents a height in the auxiliary scanning direction,

X(Y, Z) represents a SAG amount at a point (Y, Z) on the second reference plane, r is a radius of curvature of said second surface on the origin point, $\kappa$ is a conical coefficient, $B_{mn}$ represent coefficients, and a coefficient $B_{01}$ has a value other than zero.

6. A scanning optical system, comprising:

a light source;

a polygonal mirror that is rotated to deflect a beam emitted by said light source to scan; and a scanning optical element for receiving a scanning light beam deflected to scan by a deflecting system and converging the received scanning light beam on a surface to be scanned such that a beam spot moving in a main scanning direction is formed on the surface to be scanned;

said scanning optical element comprising a light transmitting material;

said scanning optical element having a first surface that allows the received scanning light beam to pass therethrough so that the scanning light beam proceeds in said scanning optical element, and a second surface that reflects the scanning beam proceeding in said scanning optical element and directs the scanning beam toward said first surface;

said first surface having a first intersection point with a first reference plane, said second surface having a second intersection point with a second reference plane;

said first reference plane and said second reference plane being perpendicular to a predetermined axis, said first and second intersection points being on said reference axis;

said first surface being an optical curved surface which is tangent to said first reference plane at said first intersection point where said predetermined axis intersects with said first reference plane;

said second surface being expressed by a SAG amount defined by a two-dimensional polynomial having variables which are two-dimensional coordinates, in the main scanning direction and in an auxiliary scanning direction of the surface to be scanned, on said second reference plane;

an origin point of said two-dimensional coordinates on said second reference plane being said second intersection point;

coefficients for the two-dimensional polynomial defining said second surface being configured such that, a coefficient for a term having only a first order component with respect to the coordinates in the auxiliary scanning direction has a value other than zero.

7. The scanning system according to claim 6, said polygonal mirror and said scanning optical element being arranged such that a beam incident on said polygonal mirror and a beam reflected by said polygonal mirror are spatially separated in the auxiliary scanning direction, and a beam incident on said scanning optical element and a beam emerging from said scanning optical element are spatially separated in the auxiliary scanning direction.

* * * * *